United States Patent
Xing

(10) Patent No.: US 10,736,453 B2
(45) Date of Patent: Aug. 11, 2020

(54) CORN KERNEL REMOVER

(71) Applicant: Haoyu Xing, Shenzhen (CN)

(72) Inventor: Haoyu Xing, Shenzhen (CN)

( * ) Notice: Subject to any disclaimer, the term of this patent is extended or adjusted under 35 U.S.C. 154(b) by 91 days.

(21) Appl. No.: 15/781,477

(22) PCT Filed: Dec. 10, 2015

(86) PCT No.: PCT/CN2015/096983
§ 371 (c)(1),
(2) Date: Jun. 5, 2018

(87) PCT Pub. No.: WO2017/096581
PCT Pub. Date: Jun. 15, 2017

(65) Prior Publication Data
US 2018/0368605 A1 Dec. 27, 2018

(51) Int. Cl.
| A47J 17/02 | (2006.01) |
| A01F 11/06 | (2006.01) |
| A01F 5/00 | (2006.01) |
| A47J 43/28 | (2006.01) |

(52) U.S. Cl.
CPC ........... *A47J 17/02* (2013.01); *A01F 5/00* (2013.01); *A01F 11/06* (2013.01); *A47J 43/28* (2013.01)

(58) Field of Classification Search
CPC .. A47J 17/02; A47J 43/18; A47J 43/28; A47J 43/283; A01F 11/06; A01F 5/00; A47G 19/303
USPC .......................................................... 294/5
See application file for complete search history.

(56) References Cited

U.S. PATENT DOCUMENTS

| 714,310 | A | * | 11/1902 | Laws |
| 889,434 | A | * | 6/1908 | Bustanoby |
| 2,415,114 | A | * | 2/1947 | Skolrud ................. A01F 11/06 460/51 |
| 3,805,384 | A | | 4/1974 | Falcone |
| 3,995,902 | A | * | 12/1976 | Sciaino, Jr. .......... A47G 19/303 294/5 |
| 5,669,505 | A | * | 9/1997 | Mayer ................. A47G 19/303 206/565 |
| 7,152,754 | B2 | * | 12/2006 | Micciulla .............. A47G 19/03 220/574 |

FOREIGN PATENT DOCUMENTS

| CN | 202232213 U | 5/2012 |
| CN | 203105139 U | 8/2013 |

(Continued)

OTHER PUBLICATIONS

Fang Wang, the International Searching Authority written comments, dated Sep. 2016, CN.
Fang Wang, the International Search Report, dated Sep. 2016, CN.

*Primary Examiner* — Stephen A Vu

(57) ABSTRACT

A corn kernel remover includes a fixing groove. A fixing portion for fixing corns is disposed at one end of the fixing groove. The fixing portion is disposed on an inner surface of the fixing groove. Because the corn kernel remover is adopted to fix the corns and a tool for stripping the corns is used to perform the operation of stripping the corn kernels, the corn kernel remover is held directly, so as to effectively prevent the tool for stripping the corns from injuring hands, thereby ensuring safer operation of stripping the corn kernels and more efficient operation of stripping the corn kernels.

13 Claims, 7 Drawing Sheets

(56) References Cited

FOREIGN PATENT DOCUMENTS

| | | |
|---|---|---|
| CN | 203691988 U | 7/2014 |
| CN | 203814225 U | 9/2014 |
| CN | 104128900 A | 11/2014 |
| CN | 204837147 U | 12/2015 |
| CN | 105453823 A | 4/2016 |
| CN | 205305467 U | 6/2016 |

* cited by examiner

CORN KERNEL REMOVER

TECHNICAL FIELD

The present disclosure relates to the field of living goods, and more particularly to a corn kernel remover.

BACKGROUND

Nowadays, people use corn strippers to strip corns, hold the corns with hands, and operate the corn strippers to obtain corn kernels.

Since sharp stripping sheets are adopted on the strip corns, the hands that hold the corns when the corns are stripped will be injured. Therefore, a safer corn kernel remover shall be developed.

SUMMARY

The purpose of the present disclosure is to provide a safer corn kernel remover.

The purpose of the present disclosure is achieved by the following technical solution:

A corn kernel remover comprises a fixing groove. A fixing portion for fixing corns is disposed at one end of the fixing groove. The fixing portion is disposed on an inner surface of the fixing groove.

Further, the corn fixing portion comprises a fixing baffle plate. The fixing baffle plate radially extends along the fixing groove. A cross section of the fixing baffle plate is circular. A marginal joint between the fixing baffle plate and the fixing groove is provided with a chamfer. Such arrangement is convenient for fixing the corns so as to effectively fix the corns. Circular design saves materials, and no corner angle exists in the circular design, so that the corn kernel remover is used more safely. Chamfer design ensures firm connection between the fixing baffle plate and the fixing groove and enables an appearance to be concise and beautiful.

Further, a fixing insertion sheet is disposed on the fixing baffle plate. The fixing insertion sheet comprises a fixing bottom sheet. An insertion sheet protrusion is disposed on the fixing bottom sheet. The fixing insertion sheet is matched with the fixing baffle plate so as to well fix the corns and effectively prevent the corns from dropping. The insertion sheet protrusion is inserted into a corn stalk so as to fix the corns more firmly, so that the work of stripping corn kernels of the corns is more convenient and efficient.

Further, positioning encircling bones are symmetrically disposed on the fixing baffle plate. The positioning encircling bones comprise an axial protrusion and a radial protrusion. The axial protrusion is connected with the fixing baffle plate. The axial protrusion is connected with the radial protrusion to form positioning chutes. The fixing bottom sheet is positioned between two positioning chutes. The positioning chutes are used to limit the fixing bottom sheet. The positioning chutes can well limit the fixing bottom sheet, so that the corns are difficult to slide down, thereby ensuring safe and reliable use of the corn kernel remover. Meanwhile, different positions of the fixing bottom sheet in the positioning chutes are regulated according to the sizes of the corns so as to fix the corns more firmly and well ensure safety of operation of stripping the corn kernels.

Further, the insertion sheet protrusion is in tapered design. Such tapered design brings convenience for fixing the corns and taking out the corns without the corn kernels. Operation is very convenient and simple.

Further, the fixing insertion sheet is bonded to the fixing baffle plate or the fixing insertion sheet and the fixing baffle plate are integrally formed. Such bonding manner brings convenience for installation, saves production cost and facilitates assembling.

Further, the fixing insertion sheet is made of metal material. In this way, durability of the fixing insertion sheet is better. Through use of the metal material, the corns are fixed well. Meanwhile, the corns are difficult to be damaged, thereby greatly enhancing the durability of the corn kernel remover.

Further, a handheld portion is disposed on the other end of the fixing groove. Through arrangement of the handheld portion, the operation of stripping the corn kernels is well performed on the corns, and hands are protected through the arrangement of the handheld portion, thereby ensuring safer operation.

Further, a handheld portion groove is formed in the handheld portion. The handheld portion groove is connected with the fixing groove through a connecting portion. A depth of the handheld portion groove is greater than a depth of the fixing groove. In this way, not only holding brings more comfort, but also safety of the hands is effectively ensured, so that use of the corn kernel remover is safer and convenient.

Further, a handheld portion through hole is formed in the handheld portion. Through arrangement of the handheld portion through hole, the corn kernel remover is well accommodated. When the corn kernel remover is not used, the corn kernel remover is hung through the handheld portion through hole, thereby saving storage space.

In the present disclosure, because the corn kernel remover is adopted to fix the corns and a tool for stripping the corns is used to perform the operation of stripping the corn kernels, the corn kernel remover is held directly, so as to effectively prevent the tool for stripping the corns from injuring the hands, thereby ensuring safer operation of stripping the corn kernels and more efficient operation of stripping the corn kernels.

In the figures: 1 lower cover; 11 first groove; 12 first through hole; 13 bottom surface; 14 corn inlet; 15 stripping sheet fixing port; 151 stripping sheet limiting column; 152 fixing portion notch; 16 cambered buckle; 17 elastic buckle; 171 buckle protrusion; 18 second groove; 2 cavity; 3 upper cover; 31 first bayonet; 32 second bayonet; 33 second through hole; 34 handheld portion; 35 anti-slip layer; 36 reinforcing rib; 4 hardware stripping sheet; 41 stripping tooth; 42 stripping sheet protrusion; 43 limiting protrusion; 44 stripping sheet limiting hole; 45 third groove; 5 corn kernel remover; 51 fixing groove; 52 fixing portion; 521 fixing baffle plate; 522 chamfer; 53 fixing insertion sheet; 531 fixing bottom sheet; 532 insertion sheet protrusion; 54 positioning encircling bone; 541 axial protrusion; 542 positioning chute; 543 radial protrusion; 55 handheld portion; 551 handheld portion groove; 552 handheld portion through hole; 56 connecting portion; 6 corn stripper; and 7 corn.

DETAILED DESCRIPTION

The present disclosure will be further described below in combination with the drawings and preferred embodiments.

Embodiment 1

Figure 1:
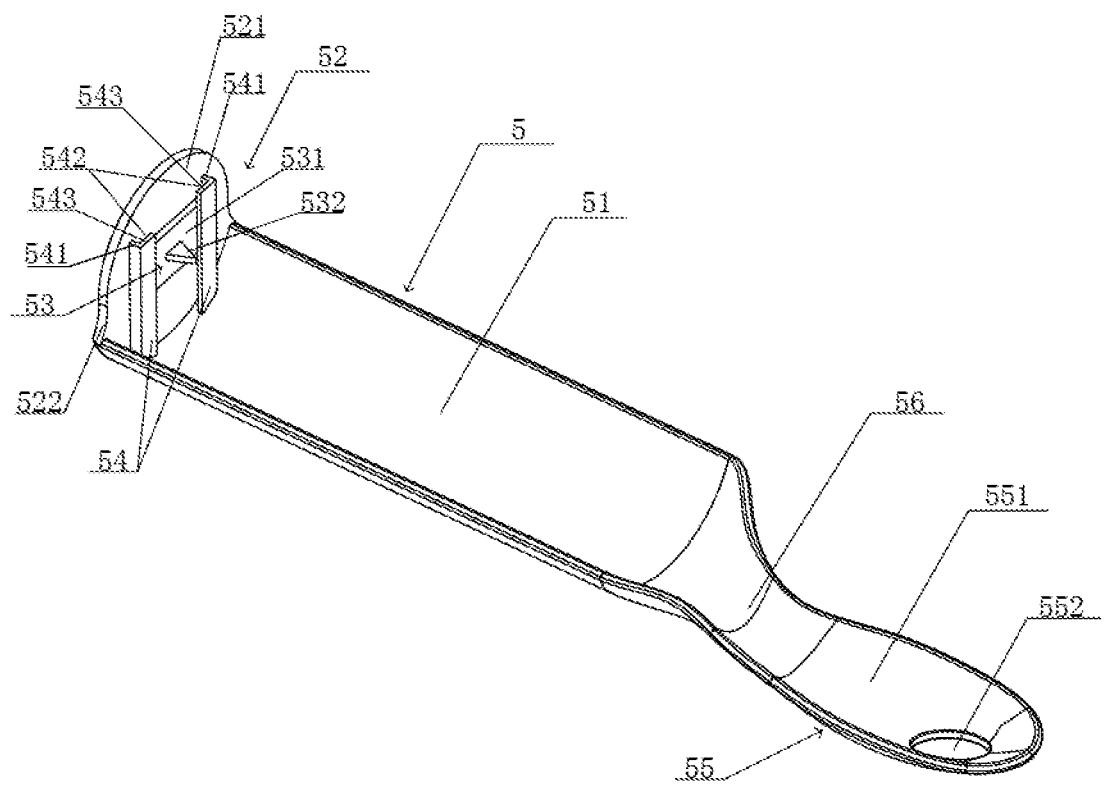
FIG. 1 is a structural schematic diagram of a corn kernel remover according to an embodiment 1 of the present disclosure.
Figure 2:
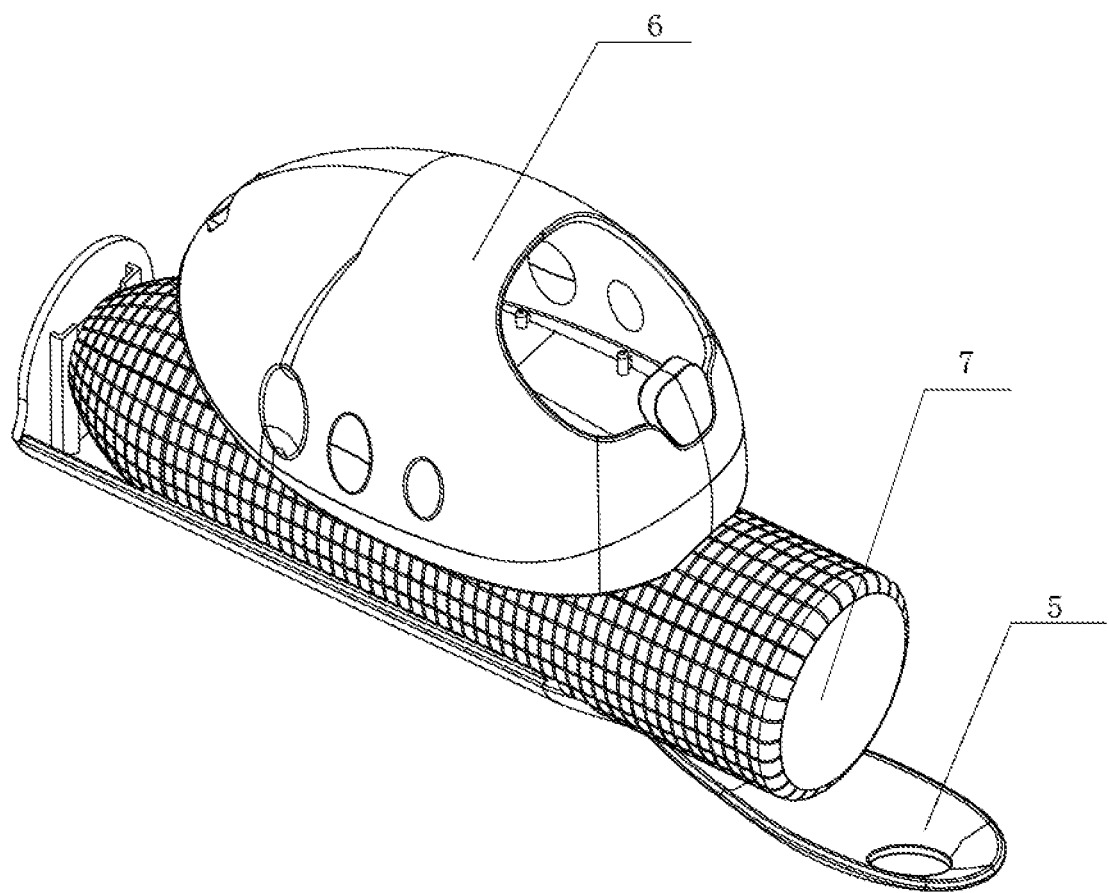
FIG. 2 is an operation schematic diagram of mutual cooperation of a corn stripper and a corn kernel remover according to an embodiment 2 of the present disclosure.
Figure 3:
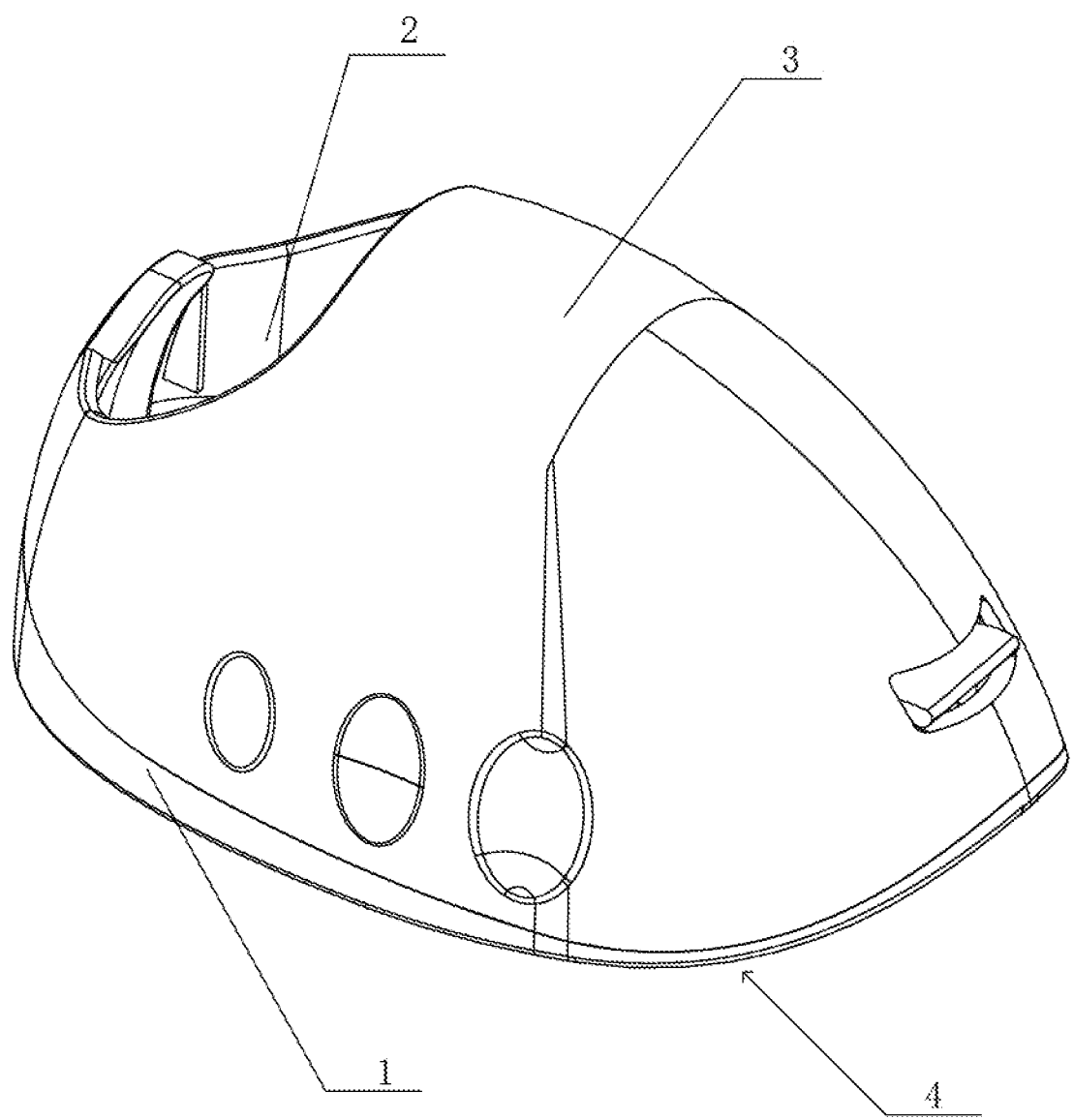
FIG. 3 is a schematic diagram of a corn stripper according to an embodiment 2 of the present disclosure.
Figure 4:
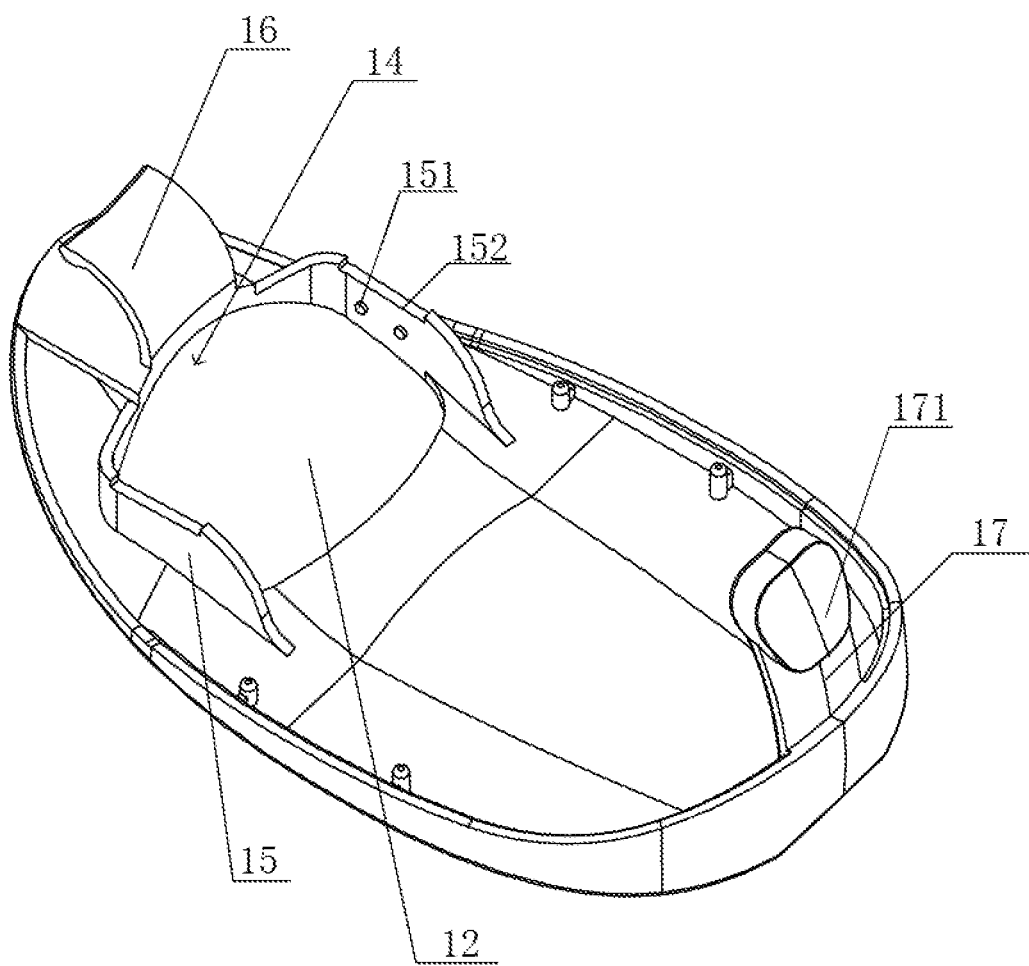
FIG. 4 is a structural schematic diagram of a lower cover of a corn stripper according to an embodiment 2 of the present disclosure.
Figure 5:
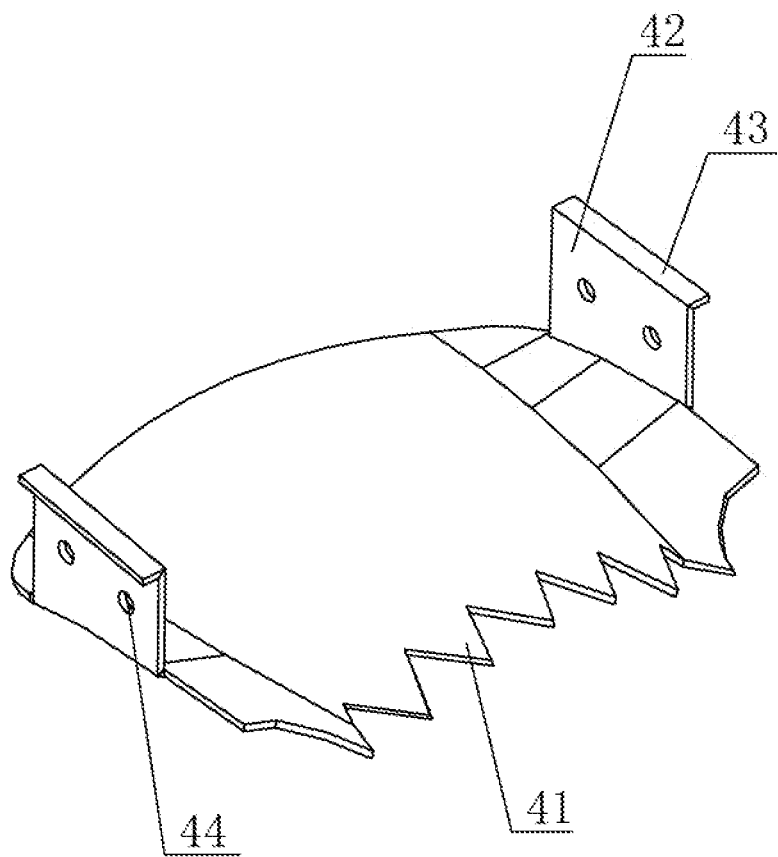
FIG. 5 is a structural schematic diagram of a hardware stripping sheet of a corn stripper according to an embodiment 2 of the present disclosure.
Figure 6:
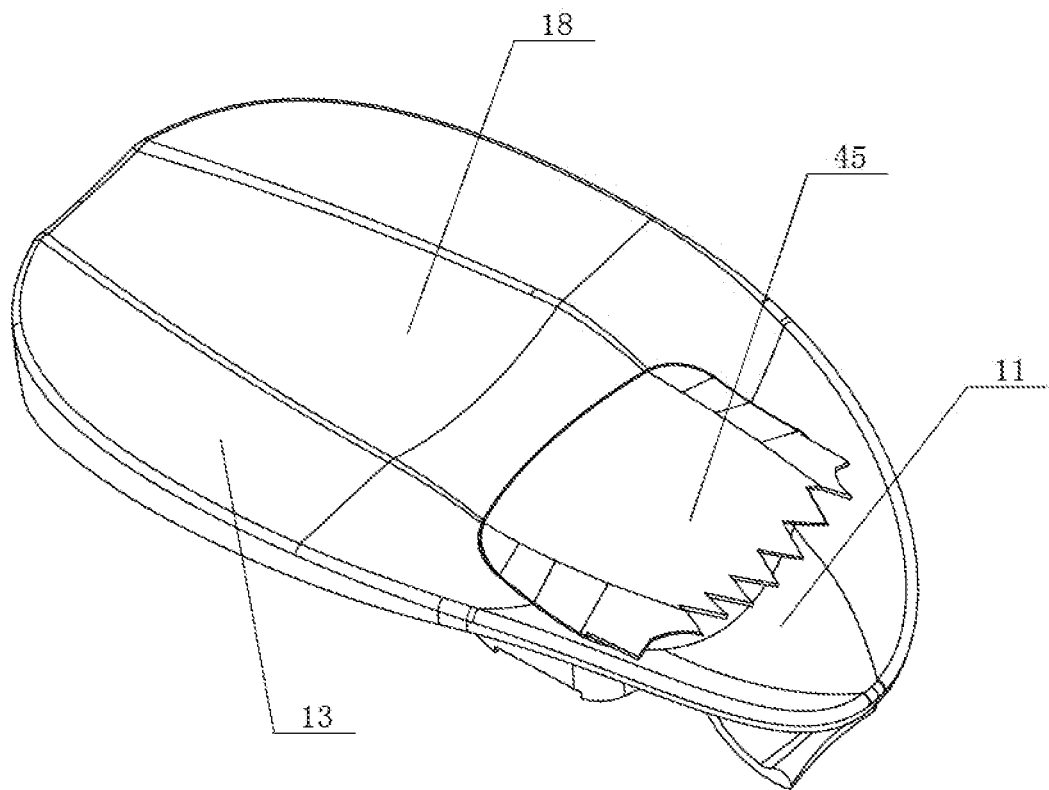
FIG. 6 is a structural schematic diagram of a lower cover of a corn stripper according to an embodiment 2 of the present disclosure.
Figure 7:
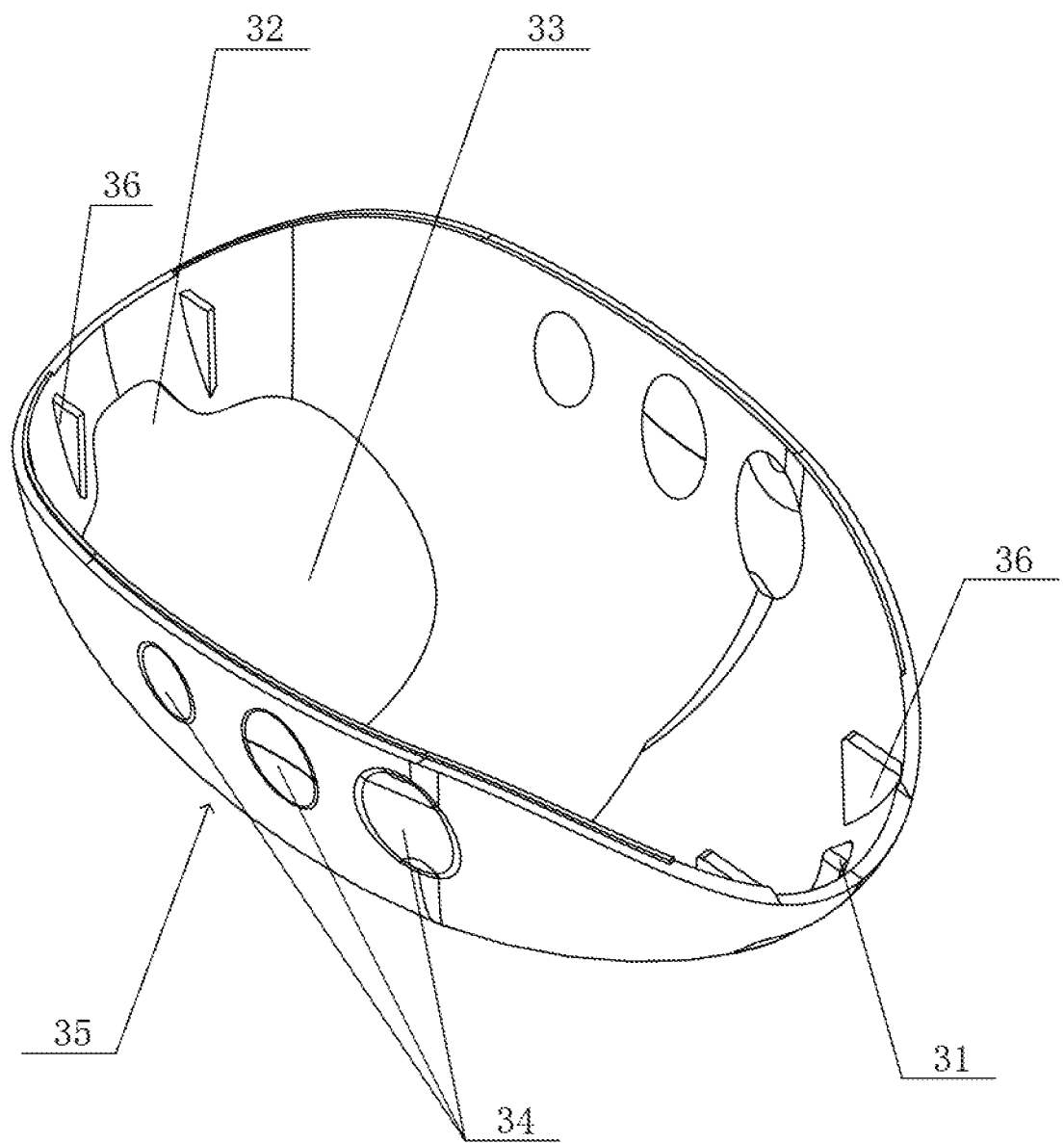
FIG. 7 is a structural schematic diagram of an upper cover of a corn stripper according to an embodiment 2 of the present disclosure.

Embodiment 1 of the present disclosure discloses a corn kernel remover. As shown in FIG. 1, the corn kernel remover 5 comprises a fixing groove 51. A fixing portion 52 for fixing corns 7 is disposed at one end of the fixing groove 51. The fixing portion 52 is disposed on an inner surface of the fixing groove 51. Through such arrangement, the corns 7 are placed conveniently. The corns 7 from which corn kernels are stripped are placed in the fixing groove 51, so that the corns 7 are fixed by the fixing portion 52. The corn kernel remover 5 is held by hands. A tool for stripping the corns is used to strip the corn kernels for the corns 7, so that the corn kernel remover is held directly, so as to effectively prevent the tool for stripping the corns 7 from injuring the hands, thereby ensuring safer operation of stripping the corn kernels and more efficient operation of stripping the corn kernels.

The corn fixing portion 52 comprises a fixing baffle plate 521. The fixing baffle plate 521 radially extends along the fixing groove 51, so as to facilitate fixation of the corns 7 and effectively fix the corns 7. A cross section of the fixing baffle plate 521 is circular. Circular design saves materials, and no corner angle exists in the circular design, so that the corn kernel remover is used more safely. A marginal joint between the fixing baffle plate 521 and the fixing groove 51 is provided with a chamfer 522. Design of the chamfer 522 ensures firm connection between the fixing baffle plate 521 and the fixing groove 51 and enables an appearance to be concise and beautiful.

A fixing insertion sheet 53 is disposed on the fixing baffle plate 521. The fixing insertion sheet 53 comprises a fixing bottom sheet 531. An insertion sheet protrusion 532 is disposed on the fixing bottom sheet 531. The fixing insertion sheet 53 is matched with the fixing baffle plate 521 so as to well fix the corns 7 and effectively prevent the corns 7 from dropping. The insertion sheet protrusion 532 is inserted into a corn stalk so as to fix the corns 7 more firmly, so that the work of stripping corn kernels of the corns 7 is more convenient and efficient.

Positioning encircling bones 54 are symmetrically disposed on the fixing baffle plate 521. The positioning encircling bones 54 comprise an axial protrusion 541 and a radial protrusion 543. The axial protrusion 541 is connected with the fixing baffle plate 521. The axial protrusion 541 is connected with the radial protrusion 543 to form positioning chutes 542. The fixing bottom sheet 531 is positioned between two positioning chutes 542. The positioning chutes 542 are used to limit the fixing bottom sheet 531. The positioning chutes 542 can well limit the fixing bottom sheet 531, so that the corns 7 are difficult to slide down, thereby ensuring safe and reliable use of the corn kernel remover 5. Meanwhile, different positions of the fixing bottom sheet 531 in the positioning chutes 542 are regulated according to the sizes of the corns 7 so as to fix the corns 7 more firmly and well ensure safety of operation of stripping the corn kernels.

The insertion sheet protrusion 532 is in tapered design, and is in a shape of a cone, a triangular pyramid, a rectangular pyramid and the like. Such tapered design brings convenience for fixing the corns 7 and taking out the corns 7 without the corn kernels. Operation is very convenient and simple.

The fixing insertion sheet 53 is bonded to the fixing baffle plate 521. Such bonding manner brings convenience for installation, saves production cost and facilitates assembling. Or the fixing insertion sheet 53 and the fixing baffle plate 521 are integrally formed. An integral forming manner increases production efficiency, facilitates processing and production and facilitates mould unloading.

The fixing insertion sheet 53 is made of metal material, and can be made of copper, steel, aluminum and the like. Such materials are difficult to corrode, so that durability of the fixing insertion sheet 53 is better. Through use of the metal material, the corns are fixed well. Meanwhile, the corns are difficult to be damaged, thereby greatly enhancing the durability of the corn kernel remover 5.

A handheld portion 55 is disposed on the other end of the fixing groove 51. Through arrangement of the handheld portion 55, the operation of stripping the corn kernels is well performed on the corns 7, and hands are well protected through the arrangement of the handheld portion, thereby ensuring safer operation.

A handheld portion groove 551 is formed in the handheld portion 55. The handheld portion groove 551 is connected with the fixing groove 51 through a connecting portion 56. A depth of the handheld portion groove 551 is greater than a depth of the fixing groove 51. Through the arrangement of the handheld portion groove 551, holding for the corn kernel remover 5 brings more convenience and comfort. The depth of the handheld portion groove 551 is greater than the depth of the fixing groove 51. In this way, not only holding brings more comfort, but also safety of the hands is effectively ensured, so that use of the corn kernel remover 5 is safer and convenient.

A handheld portion through hole 552 is formed in the handheld portion 55. Through arrangement of the handheld portion through hole 552, the corn kernel remover 5 is well accommodated. When the corn kernel remover 5 is not used, the corn kernel remover 5 is hung through the handheld portion through hole 552, thereby saving storage space. Meanwhile, through the arrangement of the handheld portion through hole 552, water in the handheld portion groove 551 and the fixing groove 51 flows out, so that the corn kernel remover 5 keeps dry and use is convenient.

Embodiment 2

Embodiment 2 of the present disclosure provides a corn stripper. As shown in FIG. 2 to FIG. 7, the corn stripper 6 comprises the corn kernel remover 5 disclosed in the embodiment 1, and also comprises an upper cover 3 and a lower cover 1. The upper cover 3 and the lower cover 1 are connected to form a cavity 2 used to store corn kernels. A first groove 11 is formed in the lower cover 1. A first through hole 12 is formed in the first groove 11. A hardware stripping sheet 4 is disposed on the lower cover 1. The hardware stripping sheet 4 is flush with a bottom surface 13 of the lower cover 1. A corn inlet 14 is formed between the hardware stripping sheet 4 and the first groove 11. The corn inlet 14 is communicated with the first through hole 12. When the corn stripper 6 is used to strip the corn kernels, the corn kernel remover 5 fixes the corns and the corn kernel remover 5 is held by hands. A tool for stripping the corns is used to perform the operation of stripping the corn kernels, so that the corn kernel remover is held directly, so as to effectively prevent the tool for stripping the corns from injuring the hands. The hardware stripping sheet 4 is flush with the bottom surface 13 of the lower cover 1. In this way, it is difficult for the hardware stripping sheet 4 to clamp into the corn stalk, so that the stripping operation of the corns 7 is more rapid and efficient. The hardware stripping sheet 4 is used to strip down the corn kernels on the corns 7. The stripped corn kernels enter the first groove 11 from the corn inlet 14. Because the corn inlet 14 is communicated with the first through hole 12, the corn kernels easily enter the cavity 2 used to store the corn kernels through the first through hole 12. In this way, the stripped corn kernels are well stored, so that the corn kernels are stored cleanly. Meanwhile, collection of the corn kernels is convenient. The stripping operation of the corns 7 is more convenient and simpler. If the corn stripper is used for long, fingers are not injured, thereby effectively ensuring safety of a user.

At least one stripping tooth 41 is uniformly disposed at one end of the hardware stripping sheet 4. Because at least one stripping tooth 41 is uniformly arranged, the operation of stripping the corn kernels for the corns 7 is convenient, so that the operation of stripping the corn kernels is more efficient and the corns 7 are stripped more cleanly. Thus, workload of the user is greatly reduced, and working efficiency is greatly increased. The hardware stripping sheet 4 is provided with a stripping sheet protrusion 42. A stripping sheet fixing portion 15 matched with the stripping sheet protrusion 42 is disposed on the lower cover 1. The stripping sheet protrusion 42 is mutually matched with the stripping sheet fixing portion 15 to clamp the hardware stripping sheet 4, so that the operation of stripping the corn kernels for the corns 7 is simple and convenient and the durability of the corn stripper 6 is greatly enhanced.

The stripping sheet fixing portion 15 is arranged around the first through hole 12. A stripping sheet limiting column 151 is disposed on the stripping sheet fixing portion 15. A stripping sheet limiting hole 44 matched with the stripping sheet limiting column 151 is formed in the stripping sheet protrusion 42. The stripping sheet limiting hole 44 formed in the stripping sheet protrusion 42 is in good close fit with the stripping sheet limiting column 151 disposed on the stripping sheet fixing portion 15, so as to well limit the hardware stripping sheet 4, so that the fixation of the hardware stripping sheet 4 is more firm. Thus, the operation of stripping the corn kernels is performed more efficiently and the durability of the corn stripper 6 is greatly enhanced. Meanwhile, in this fixing structure, the hardware stripping sheet 4 is also convenient to disassemble for replacement, thereby avoiding material waste and realizing environmental protection.

A limiting protrusion 43 is disposed on the stripping sheet protrusion 42. The limiting protrusion 43 is matched and clamped with the stripping sheet fixing portion 15. A fixing portion notch 152 is formed in the stripping sheet fixing portion 15. The fixing portion notch 152 limits the stripping sheet protrusion 42. The limiting protrusion 43 is clamped on the stripping sheet fixing portion 15, so that the hardware stripping sheet 4 is difficult to drop and the efficiency of stripping the corn kernels is greatly increased. The fixing portion notch 152 limits the stripping sheet protrusion 42. In this way, double clamping and limiting well fix the hardware stripping sheet 4, so that the fixation of the hardware stripping sheet 4 is more firm, thereby greatly enhancing the durability of the corn stripper 6 and ensuring that the operation of stripping the corn kernels is convenient and labor-saving. When the hardware stripping sheet 4 needs to be replaced, the hardware stripping sheet 4 is convenient to disassemble so as to avoid discarding the entire corn stripper 6 due to the damage of the hardware stripping sheet 4, thereby well protecting the environment and realizing environmental protection.

A cambered buckle 16 is disposed at one end of the lower cover 1. A first buckle 31 matched with the cambered buckle 16 is disposed on the upper cover 3. An elastic buckle 17 is disposed at the other end of the lower cover 1. A buckle protrusion 171 is disposed on the elastic buckle 17. A second bayonet 32 matched with the buckle protrusion 171 is disposed on the upper cover 3. In this way, the lower cover 1 and the upper cover 3 are well fixed from both ends, so that the fixation of the upper cover and the lower cover is convenient and simple. Meanwhile, the formed cavity 2 better stores the stripped corn kernels. The elastic buckle 17 is not matched with the second bayonet 32 through pressing, so that the disassembly of the upper cover and the lower cover is convenient. In this way, it is convenient to disassemble and clean the upper cover 3 and the lower cover 1, thereby ensuring that the cavity 2 is clean and tidy.

A second through hole 33 is formed in the upper cover 3. The second through hole 33 is connected with the second bayonet 32. Such arrangement saves materials, reduces production cost and facilitates mould unloading of the upper cover 3 and the lower cover 1.

Handheld portions 34 are symmetrically disposed on the upper cover 3. Anti-slip layers 35 are disposed on the handheld portions 34. Through such arrangement, holding operation for the upper cover 3 is convenient. Meanwhile, the anti-slip layers 35 have a good anti-slip function, so that the operation is more efficient and the stripping speed of the corn kernels is greatly increased.

A second groove 18 is formed in the lower cover 1. The second groove 18 is connected with the first groove 11. A depth of the first groove 11 is greater than a depth of the second groove 18. The second groove 18 is configured to well fit with the corns 7 from which the corn kernels are stripped, so that the operation of stripping the corn kernels is more rapid and the operation of stripping the corn kernels is well done for the corns 7. Meanwhile, the corns 7 are stripped more thoroughly, and corresponding corn kernels are difficult to leave on the corn stalk.

A third groove 45 is formed in the hardware stripping sheet 4. The third groove 45 is communicated with the second groove 18. Joints of the second groove 18 and the third groove 45 have the same depth. The third groove 45 is formed in the hardware stripping sheet 4, so that the hardware stripping sheet 4 is fitted with the corns 7 and the operation of stripping the corn kernels is more convenient. Through the cooperation of the second groove 18 and the third groove 45, the operation efficiency of stripping the corns 7 is greatly increased.

The upper cover 3 adopts cambered design confirming to human engineering. The cambered design confirming to human engineering is very convenient for holding and well increases the efficiency of stripping the corn kernels. The reinforcing rib 36 is disposed on the upper cover 3. Through the arrangement of the reinforcing rib 36, the upper cover 3 is well supported and rigidity of the upper cover 3 is enhanced. Thus, the upper cover 3 is more difficult to damage, so that the corn stripper 6 is more durable. The upper cover 3 is a semi-transparent shell. Through adoption of a PC transparent shell, conditions in the cavity 2 are observed clearly, so as to well judge whether the cavity 2 is filled with the corn kernels and better judge whether the upper cover 3 and the lower cover 1 need washing. Meanwhile, the appearance is simple and beautiful.

The above contents are further detailed descriptions of the present disclosure in combination with specific preferred embodiments. However, the concrete implementation of the present disclosure shall not be considered to be only limited to these descriptions. For those ordinary skilled in the art to which the present disclosure belongs, several simple deductions or replacements may be made without departing from the conception of the present disclosure, all of which shall be considered to belong to the protection scope of the present disclosure.

The invention claimed is:

1. A corn kernel remover, comprising a fixing groove, wherein a fixing portion for fixing corns is disposed at a first end of the fixing groove; a handheld portion is disposed on a second end of the fixing groove opposite to the fixing portion; a handheld portion groove is formed in the handheld portion and connected with the fixing groove through a connecting portion; wherein a depth of the handheld portion groove is greater than a depth of the fixing groove; and the fixing portion is disposed on an inner surface of the fixing groove.

2. The corn kernel remover according to claim 1, wherein the corn fixing portion comprises a fixing baffle plate; the fixing baffle plate radially extends along the fixing groove; a cross section of the fixing baffle plate is circular; and a marginal joint between the fixing baffle plate and the fixing groove is provided with a chamfer.

3. The corn kernel remover according to claim 2, wherein a fixing insertion sheet is disposed on the fixing baffle plate; the fixing insertion sheet comprises a fixing bottom sheet; and an insertion sheet protrusion is disposed on the fixing bottom sheet.

4. The corn kernel remover according to claim 3, wherein positioning encircling bones are symmetrically disposed on the fixing baffle plate; the positioning encircling bones comprise an axial protrusion and a radial protrusion; the axial protrusion is connected with the fixing baffle plate; the axial protrusion is connected with the radial protrusion to form positioning chutes; the fixing bottom sheet is positioned between two positioning chutes; and the positioning chutes are used to limit the fixing bottom sheet.

5. The corn kernel remover according to claim 3, wherein the insertion sheet protrusion is in tapered design.

6. The corn kernel remover according to claim 3, wherein the fixing insertion sheet is bonded to the fixing baffle plate or the fixing insertion sheet and the fixing baffle plate are integrally formed.

7. The corn kernel remover according to claim 3, wherein the fixing insertion sheet is made of metal material.

8. The corn kernel remover according to claim 1, wherein a handheld portion through hole is formed in the handheld portion.

9. A corn kernel remover, comprising a fixing groove, wherein a fixing portion for fixing corns is disposed at one end of the fixing groove; and the fixing portion is disposed on an inner surface of the fixing groove; and the corn fixing portion comprises a fixing baffle plate; the fixing baffle plate radially extends along the fixing groove; a cross section of the fixing baffle plate is circular; and a marginal joint between the fixing baffle plate and the fixing groove is provided with a chamfer; wherein a fixing insertion sheet is disposed on the fixing baffle plate; the fixing insertion sheet comprises a fixing bottom sheet; and an insertion sheet protrusion is disposed on the fixing bottom sheet.

10. The corn kernel remover according to claim 9, wherein positioning encircling bones are symmetrically disposed on the fixing baffle plate; the positioning encircling bones comprise an axial protrusion and a radial protrusion; the axial protrusion is connected with the fixing baffle plate; the axial protrusion is connected with the radial protrusion to form positioning chutes; the fixing bottom sheet is positioned between two positioning chutes; and the positioning chutes are used to limit the fixing bottom sheet.

11. The corn kernel remover according to claim 9, wherein the insertion sheet protrusion is in tapered design.

12. The corn kernel remover according to claim 9, wherein the fixing insertion sheet is bonded to the fixing baffle plate or the fixing insertion sheet and the fixing baffle plate are integrally formed.

13. The corn kernel remover according to claim 9, wherein the fixing insertion sheet is made of metal material.

* * * * *